(12) United States Patent
Bell et al.

(10) Patent No.: US 8,380,778 B1
(45) Date of Patent: Feb. 19, 2013

(54) SYSTEM, METHOD, AND COMPUTER PROGRAM PRODUCT FOR ASSIGNING ELEMENTS OF A MATRIX TO PROCESSING THREADS WITH INCREASED CONTIGUOUSNESS

(75) Inventors: William N. Bell, Champaign, IL (US); Michael J. Garland, Lake Elmo, MN (US)

(73) Assignee: NVIDIA Corporation, Santa Clara, CA (US)

( * ) Notice: Subject to any disclaimer, the term of this patent is extended or adjusted under 35 U.S.C. 154(b) by 1517 days.

(21) Appl. No.: 11/924,379

(22) Filed: Oct. 25, 2007

(51) Int. Cl.
*G06F 7/38* (2006.01)
(52) U.S. Cl. .................................................. 708/520
(58) Field of Classification Search ............... 708/520
See application file for complete search history.

(56) References Cited

U.S. PATENT DOCUMENTS 6,907,513 B2 * 6/2005 Nakanishi ............... 708/520
2008/0126467 A1 * 5/2008 Ghuloum ............... 708/520

OTHER PUBLICATIONS

Pinar et al, "Improving Performance of Sparse Matrix-Vector Multiplication", In Proceedings of Supercomputing, 1999.*
Kapadia et al., "Block-Row Sparse Matrix-Vector Multiplication on SIMD Machines," Proc. of the 24$^{th}$ International Conference on Parallel Processing, 1995.
"SPARSEKIT: Sparse Matrix Utility Package," Aug. 30, 2005, http://peoole.scs.fsu.edu/~burkardt/f_src/sparsekit/sparsekit.html.

* cited by examiner

*Primary Examiner* — Tan V. Mai
(74) *Attorney, Agent, or Firm* — Zilka-Kotab, PC

(57) ABSTRACT

A system, method, and computer program product are provided for assigning elements of a matrix to processing threads. In use, a matrix is received to be processed by a parallel processing architecture. Such parallel processing architecture includes a plurality of processors each capable of processing a plurality of threads. Elements of the matrix are assigned to each of the threads for processing, utilizing an algorithm that increases a contiguousness of the elements being processed by each thread.

21 Claims, 9 Drawing Sheets

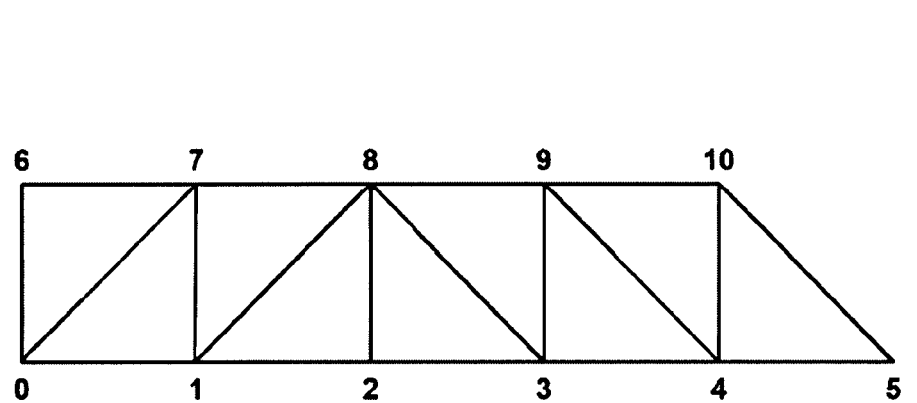
FIGURE 3-A
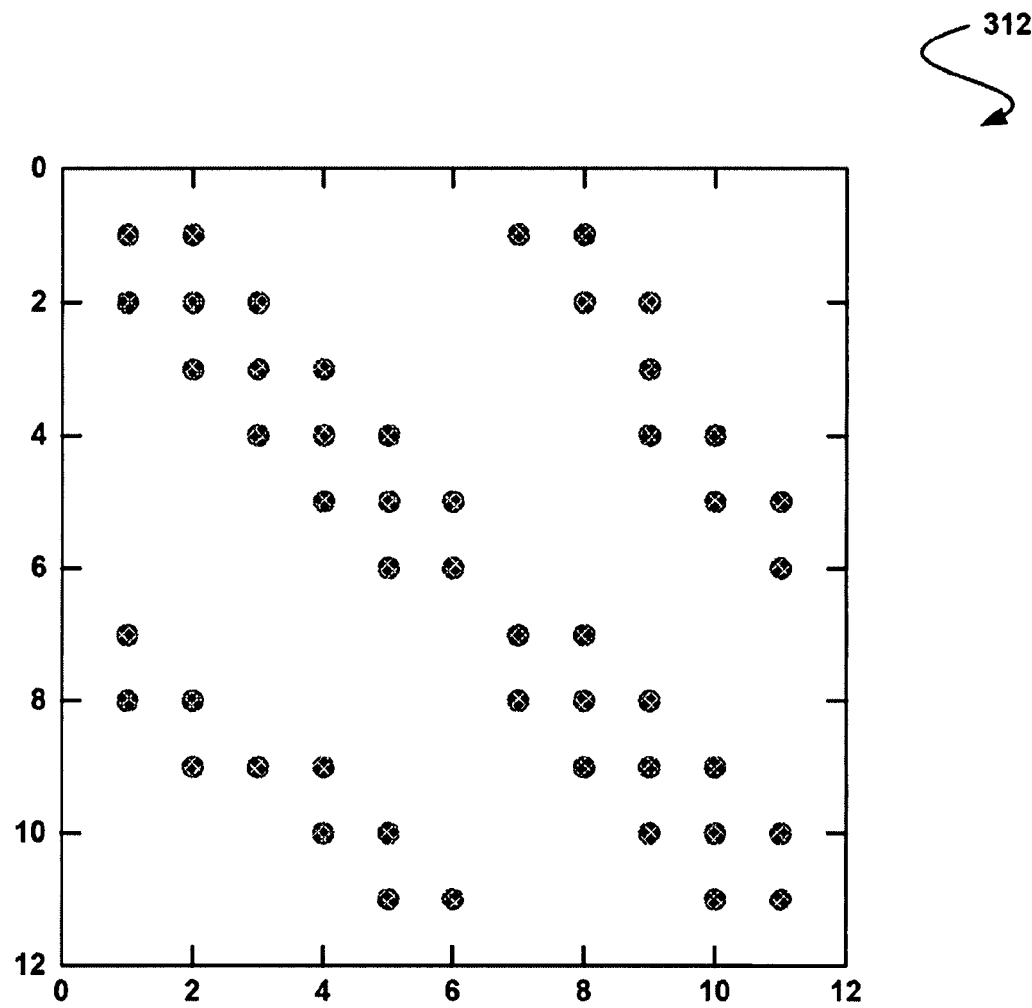
FIGURE 3-B

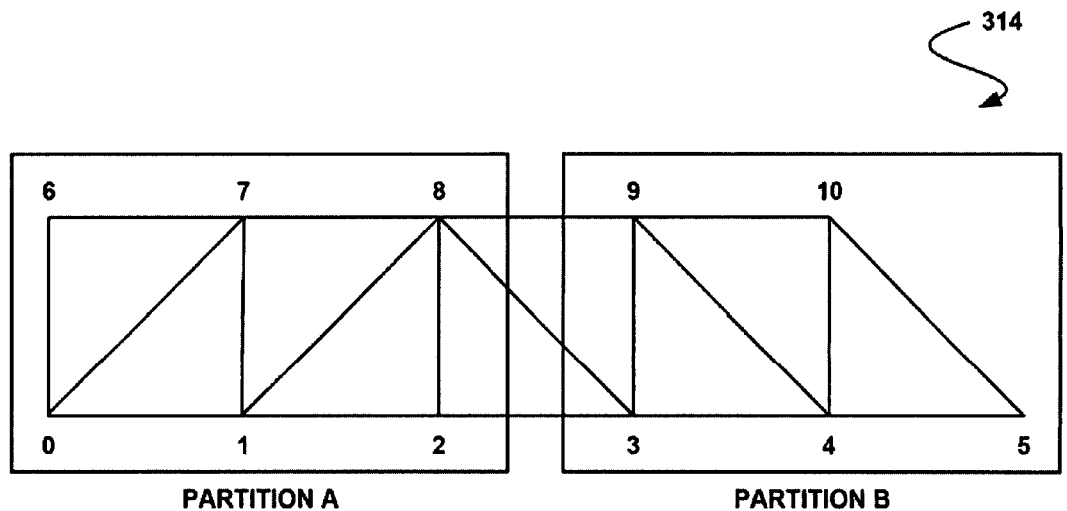
FIGURE 3-C
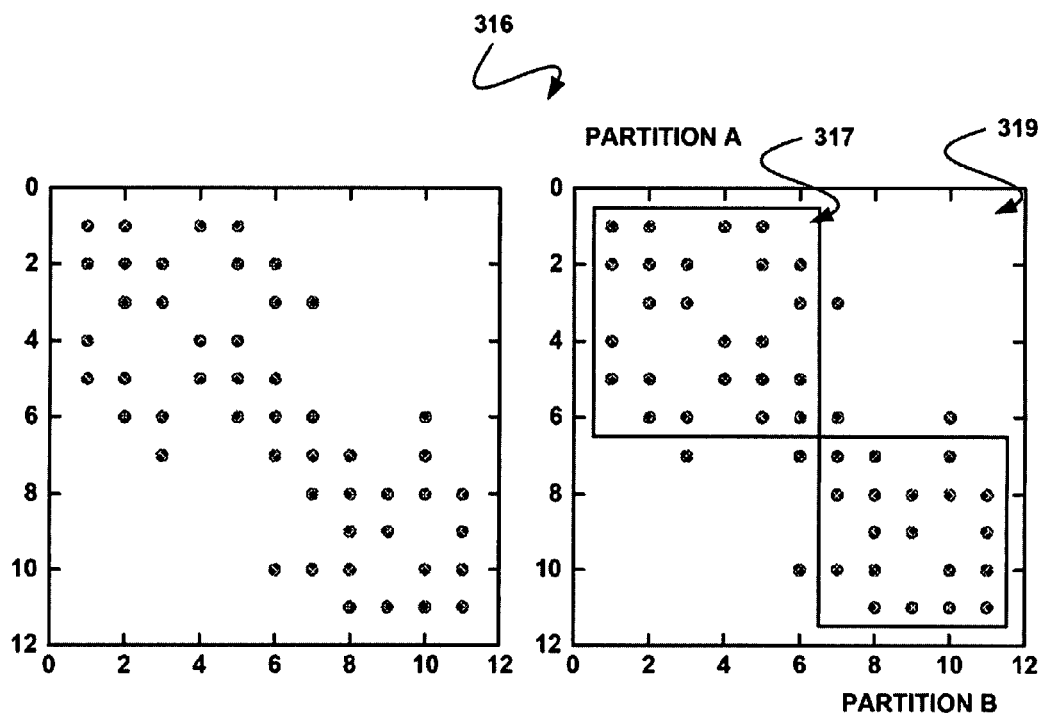
FIGURE 3-D

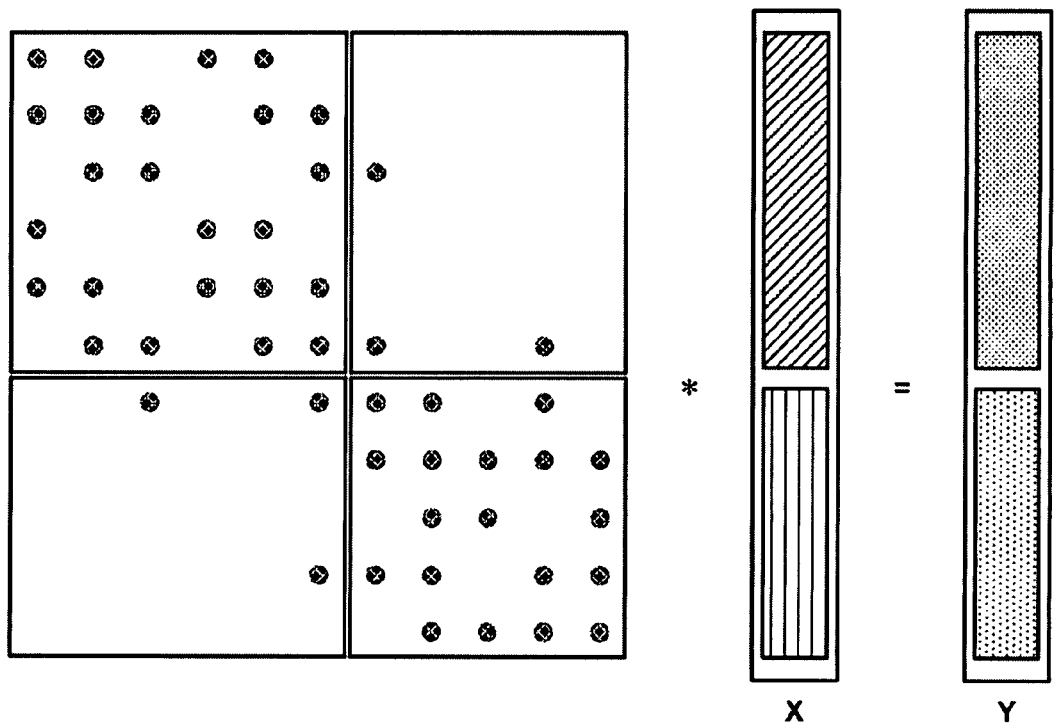
FIGURE 3-E

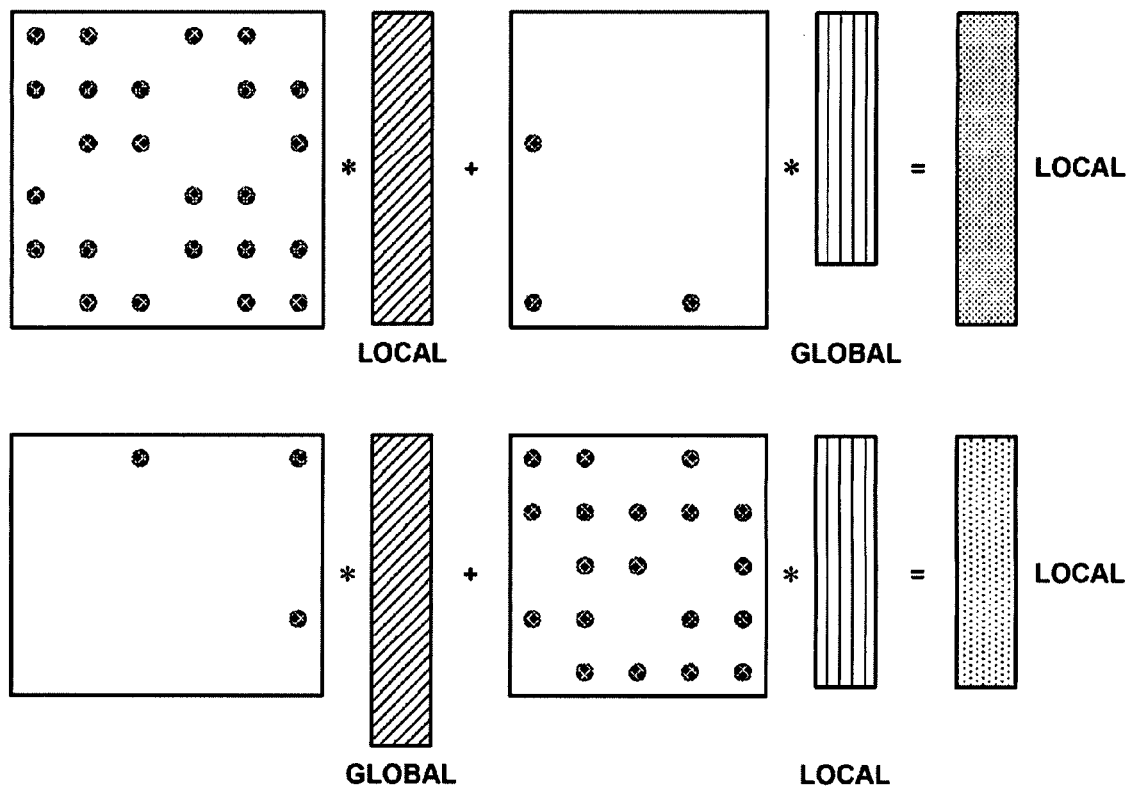
FIGURE 3-F

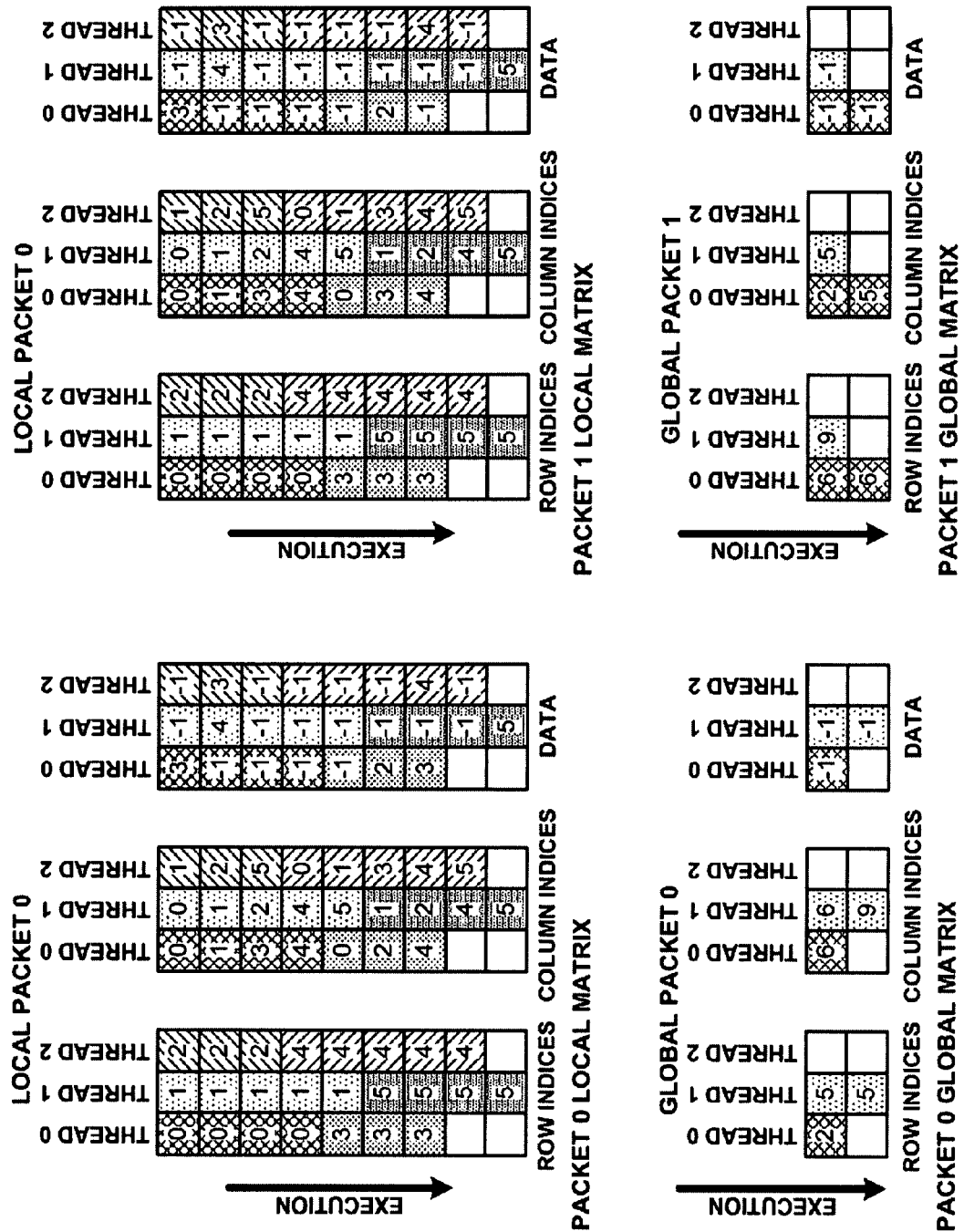
FIGURE 3-G

SYSTEM, METHOD, AND COMPUTER PROGRAM PRODUCT FOR ASSIGNING ELEMENTS OF A MATRIX TO PROCESSING THREADS WITH INCREASED CONTIGUOUSNESS

FIELD OF THE INVENTION

The present invention relates to matrix operations, and more particularly to systems that perform operations on matrices.

BACKGROUND

A sparse matrix representation typically represents and/or stores only non-zero elements of the matrix, in contrast to a dense representation which stores all elements regardless of their value. Matrix sparsity refers to the number and pattern of non-zeros in a particular matrix. In the context of a graphics processing environment, sparse matrices are often derived from an unstructured mesh, etc. To date, many systems are equipped for performing operations (e.g. matrix-vector multiplication, etc.) efficiently on dense matrices. Parallel processing architectures (e.g. graphics processors, etc.) are examples of such systems.

Thus, in situations where a sparse matrix is operated upon with such systems, performance tends to be less than desirable. For example, such systems may exhibit incoherent memory accesses, potential work imbalance amongst processing threads, etc.

SUMMARY

A system, method, and computer program product are provided for assigning elements of a matrix to processing threads. In use, a matrix is received to be processed by a parallel processing architecture. Such parallel processing architecture includes a plurality of processors each capable of processing a plurality of threads. Elements of the matrix are assigned to each of the threads for processing, utilizing an algorithm that increases the contiguousness of the elements being processed by each thread.

BRIEF DESCRIPTION OF THE DRAWINGS

FIGS. 3-A, 3-B, 3-C, 3-D, 3-E, 3-F, and 3-G show various stages of the method of FIG. 3.

DETAILED DESCRIPTION

Figure 1:
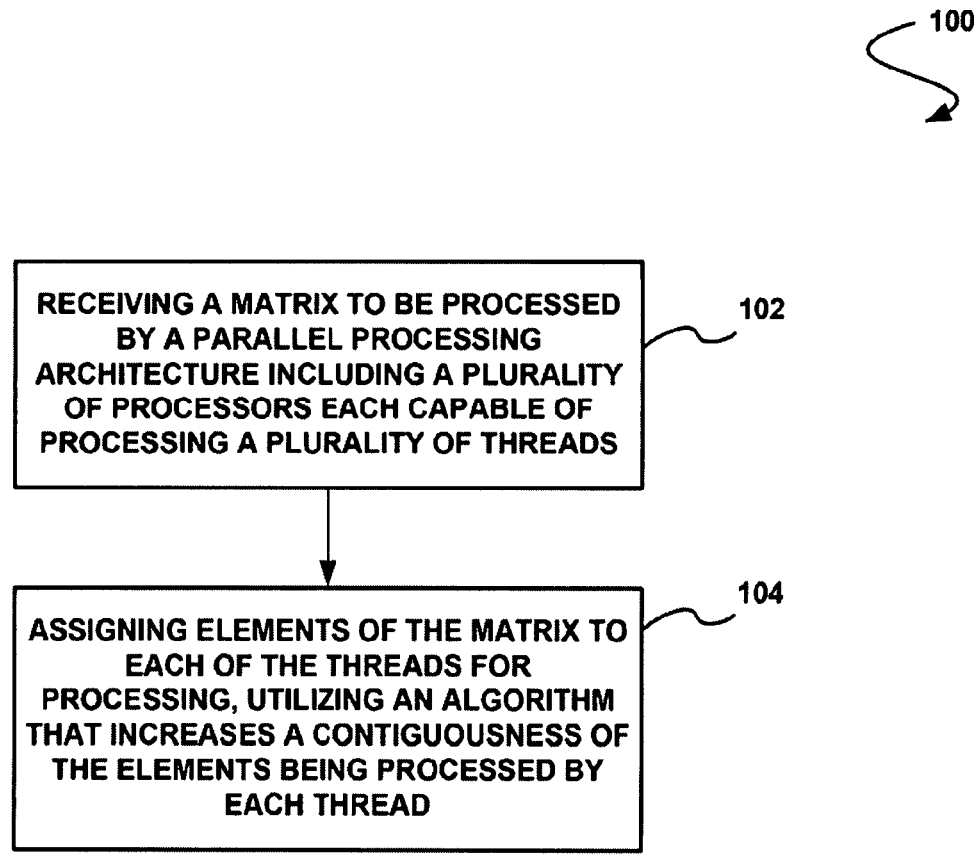
FIG. 1 shows a method for assigning elements of a matrix to threads for processing, in accordance with one embodiment of the present invention.

FIG. 1 shows a method 100 for assigning elements of a matrix to threads for processing, in accordance with one embodiment of the present invention. As shown, a matrix is received to be processed by a parallel processing architecture. See operation 102. In the context of the present description, such matrix may include any elements (e.g. numbers, characters, and/or any other entities, etc.) capable of being arranged in rows and columns.

Further, the processing of the matrix may include any operation capable of being feasibly performed with respect to the matrix. For example, such processing may include, but is not limited to multiplication, addition, and/or any other processing that meets the above definition. In optional embodiment, the processing may involve the multiplication of the matrix with a vector. Still yet, the aforementioned parallel processing architecture includes a plurality of processors each capable of processing a plurality of threads.

With continuing reference to FIG. 1, elements of the matrix are assigned to each of the threads for processing. See operation 104. Further, this assignment is accomplished, utilizing an algorithm that increases the contiguousness of the elements being processed by each thread. This may be of particular benefit when a sparse matrix is involved, where such sparse matrix has a number of nonzero elements that is a small fraction of the total possible number of elements. Of course, the foregoing sparse matrix application is set forth for illustrative purposes only, as any application (e.g. involving other graph/mesh algorithms, etc.) is contemplated.

In the context of the present description, contiguousness of the elements refers to a situation where, immediately after a first non-zero element is assigned to a particular thread, a second non-zero element is assigned to such thread, if possible. For example, in various embodiments, this may be accomplished by assigning the elements of the matrix to each of the threads in a manner that is, at least in part, independent of an order of a row and a column of the matrix.

Strictly as an option, further optimization may be afforded by reordering the elements of the matrix to define at least one first portion and at least one second portion.

In one embodiment, this may be accomplished prior to the aforementioned assignment of operation 104. By this feature, the elements of the first portion of the matrix may be processed utilizing a first memory (e.g. shared memory, etc.). Further, the elements of the second portion of the matrix may be processed utilizing a second memory (e.g. global memory, etc.) separate from the first memory.

In one embodiment, the aforementioned reordering may serve to increase the number of elements in the first portion of the matrix that are subject to the operation utilizing the first memory. This may, in some embodiments, increase efficiency. For example, by using the first memory (e.g. shared memory, etc.) more and using the second memory (e.g. global memory, etc.) less, a reduced number of scattered accesses may be made in conjunction with such global memory, which is desirable as scattered accesses to memories are typically slower than contiguous accesses. Furthermore, it may be the case that access times to the first memory are substantially lower than access times to the second memory, which may also lead to increased efficiency through increased use of the first memory.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
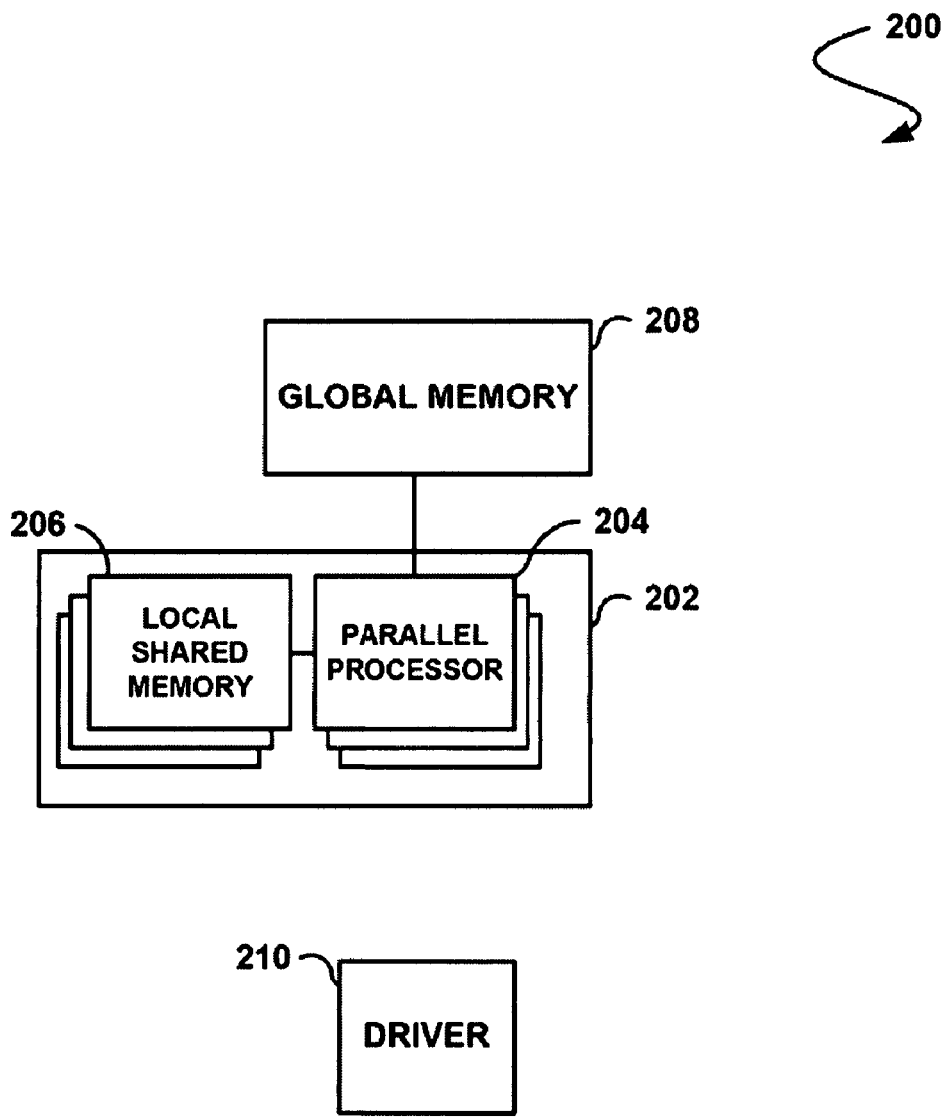
FIG. 2 shows a system for assigning elements of a matrix to threads for processing, in accordance with one embodiment of the present invention.

FIG. 2 shows a system 200 for assigning elements of a matrix to threads for processing, in accordance with one embodiment of the present invention. As an option, the present system may be implemented to carry out the method 100 of FIG. 1. Of course, however, the present system may be implemented in any desired environment. It should also be noted that the aforementioned definitions may apply during the present description.

As shown, a parallel processing architecture 202 is provided. Such parallel processing architecture includes a plurality of parallel processors 204. While not shown, such parallel processors may be capable of operating on a predetermined number of threads. To this end, each of the parallel processors may operate in parallel, while the corresponding threads may also operate in parallel.

In one embodiment, the parallel processing architecture may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture includes local shared memory 206. Each of the parallel processors of the parallel processing architecture may read and/or write to its own local shared memory. This shared memory may consist of physically separate memories associated with each processor or it may consist of separately allocated regions of one or more memories shared amongst the processors. Further, in the illustrated embodiment, the shared memory may be embodied on an integrated circuit on which the processors of the parallel processing architecture are embodied.

Still yet, global memory 208 is shown to be included. In use, such global memory is accessible to all the processors of the parallel processing architecture. As shown, such global memory may be embodied on an integrated circuit that is separate from the integrated circuit on which the processors of the aforementioned parallel processing architecture are embodied. While the parallel processing architecture is shown to be embodied on the various integrated circuits of FIG. 2 in a specific manner, it should be noted that the system components may or may not be embodied on the same integrated circuit, as desired.

Still yet, the present system of FIG. 2 may further include a driver 210 for controlling the parallel processing architecture, as desired. In one embodiment, the driver may include a library, for facilitating such control. For example, such library may include a library call that may instantiate the functionality set forth herein. Further, in another embodiment, the driver may be capable of providing general computational capabilities utilizing the parallel processing architecture (e.g. a graphics processor, etc.). An example of such a driver may be provided in conjunction with the CUDA™ framework provided by NVIDIA Corporation.

In use, the driver may be used to control the parallel processing architecture to assign elements of a matrix to the aforementioned threads for processing. In one embodiment, such matrix elements may be assigned to processing threads in accordance with the method of FIG. 1. Another embodiment for matrix element assignment will now be set forth during reference of FIG. 3.

Figure 3:
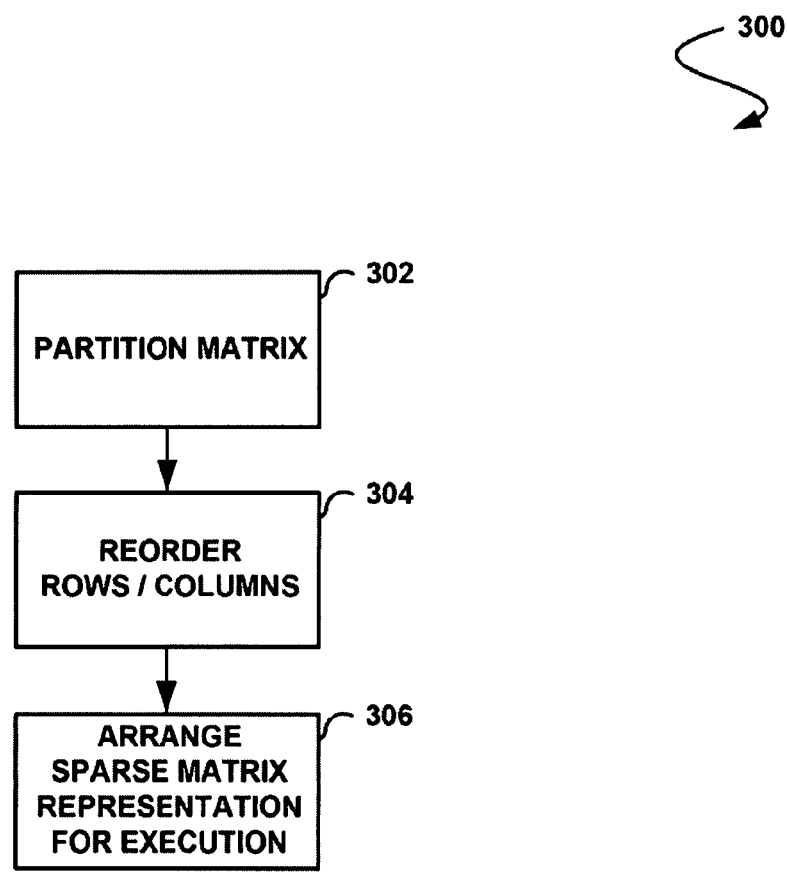
FIG. 3 shows a method for generating a sorted array of elements, in accordance with another embodiment of the present invention.

FIG. 3 shows a method 300 for generating a sorted array of elements, in accordance with another embodiment of the present invention. As an option, the present method may be implemented in the context of the functionality and architecture of FIGS. 1-2. Of course, however, the instant method may be carried out in any desired environment. Again, the aforementioned definitions may apply during the present description.

The present method will be set forth in the context of a sample mesh (see mesh 310 of FIG. 3-A). For such mesh, a sparse matrix is provided which encodes a connectivity of the mesh vertices. See the exemplary matrix set forth in Table 1. Of course, such mesh associated matrix are set forth for illustrative purposes only and should not be construed as limiting in any manner.

TABLE 1

```
[ 3  -1                          -1  -1            ]
[-1   4  -1                          -1  -1        ]
[    -1   3  -1                          -1        ]
[        -1   4  -1                      -1  -1    ]
[            -1   4  -1                      -1  -1]
[                -1   2                          -1]
[-1                       2  -1                    ]
[-1  -1                  -1   4  -1                ]
[    -1  -1  -1              -1   5  -1            ]
[            -1  -1                  -1   4  -1    ]
[                -1  -1                  -1   3    ]
```

FIG. 3-B illustrates a sparsity structure 312 of the matrix of Table 1.

In operation 302, the matrix is first partitioned. Such partitioning may be accomplished in any desired manner. For example, a graph partitioner may be used. It should be noted that any desired graph partitioner may be used. Exemplary graph partitioners include, but are certainly not limited to CHACO, METIS, etc. Based on whether the matrix is symmetric or not, one might choose to perform partitioning based on one of A, (transpose(A)+A), (A*transpose(A)), and (transpose(A)*A). Other partitioning algorithms that do not rely on an interpretation of the matrix as a graph may also be used, specifically for the case when the matrix is asymmetric.

FIG. 3-C shows an example of such a partition 314 that splits the vertices into two aggregates including partition A and partition B. In one embodiment, such graph partitioner may serve to split the vertices into similarly sized aggregates such that the total number of cut edges (i.e. edges between aggregates, etc.) is minimized. In the partition 314 of FIG. 3-C, the edge cut is 3 and partitions A and B have 6 and 5 vertices, respectively.

With continuing reference to FIG. 3, rows and columns of the matrix are then reordered. See operation 304. As an option, such reordering may be performed by a central processing unit (CPU). Of course, other embodiments are contemplated in which the reordering is performed by any desired component (e.g. a graphics processor, etc.).

In one embodiment, such rows and columns of the matrix may be reordered so that the rows and columns of one partition precede those of another. In the context of the foregoing exemplary matrix and mesh, the associated rows and columns may be reordered so that the rows and columns of partition A precede those of partition B. See Table 2, for example.

TABLE 2

| Old Order: | [0, | 1, | 2, | 3, | 4, | 5, | 6, | 7, | 8, | 9, | 10] |
|---|---|---|---|---|---|---|---|---|---|---|---|
| New Order: | [0, | 1, | 2, | 6, | 7, | 8, | 3, | 4, | 5, | 9, | 10] |

After reordering the rows and columns of the matrix of Table 1, the matrix of Table 3 is provided.

TABLE 3

| [3 | −1 | 0 | −1 | −1 | 0 | 0 | 0 | 0 | 0 | 0] |
|---|---|---|---|---|---|---|---|---|---|---|
| [−1 | 4 | −1 | 0 | −1 | −1 | 0 | 0 | 0 | 0 | 0] |
| [0 | −1 | 3 | 0 | 0 | −1 | −1 | 0 | 0 | 0 | 0] |
| [−1 | 0 | 0 | 2 | −1 | 0 | 0 | 0 | 0 | 0 | 0] |
| [−1 | −1 | 0 | −1 | 4 | −1 | 0 | 0 | 0 | 0 | 0] |
| [0 | −1 | −1 | 0 | −1 | 5 | −1 | 0 | 0 | −1 | 0] |
| [0 | 0 | −1 | 0 | 0 | −1 | 4 | −1 | 0 | −1 | 0] |
| [0 | 0 | 0 | 0 | 0 | 0 | −1 | 4 | −1 | −1 | −1] |
| [0 | 0 | 0 | 0 | 0 | 0 | 0 | −1 | 2 | 0 | −1] |
| [0 | 0 | 0 | 0 | −1 | −1 | −1 | 0 | 4 | −1] | |
| [0 | 0 | 0 | 0 | 0 | 0 | 0 | −1 | −1 | −1 | 3] |

FIG. 3-D illustrates a sparsity structure 316 of the matrix of Table 3, as well as the partitioning. It may be observed that the cut edges correspond to nonzero elements outside the two partitions A and B.

As shown, the number of such nonzero elements outside the partitions A and B is minimized. Thus, two portions are defined, a first portion 317 defined by the area within partitions A and B, and a second portion 319 defined by the area outside partitions A and B. The elements of the first portion of the matrix may be processed utilizing a first memory (e.g. shared memory 206 of FIG. 2). Further, the elements of the second portion of the matrix may be processed utilizing a second memory (e.g. global memory 208 of FIG. 2). Thus, in one embodiment, local nonzero elements (from the above-mentioned first portion) correspond to data loads from shared memory, while the global nonzero elements (from the above-mentioned second portion) require loads from global memory.

In use, for the rows belonging to the first portion, a kernel may first read the first 6 values from the x-vector into shared memory. When computing the product y(i)+=MATRIX (i,j)*x(j), if the column j is among the first 6, x(j) may be fetched from shared memory. When the column corresponds to a node in the second portion, x(j) may be loaded from global memory. While such incoherent global loads are expensive, they are minimized by the reordering of operation 304. In one possible embodiment, roughly half of shared memory may be reserved for storing the local x-values, and the other half may be used to store the corresponding y-values. Once all of the y-values have been computed, the threads may copy the result to global memory. FIGS. 3-E and 3-F illustrate such operation. To this end, the method thus far serves to reorder the matrix to localize memory accesses.

With continuing reference to FIG. 3, the sparse matrix representation may then be arranged for execution, for further optimization. In various embodiments, the sparse matrix representation may be arranged to exploit locality, permit coalesced loads, and/or mitigate thread divergence. Specifically, to accomplish this in the context of one exemplary embodiment, the matrix of Table 3 may be subdivided into four portions: upper left (UL) submatrix, upper right (UR) submatrix, lower left (LL) submatrix, lower right (LR) submatrix, as shown in Table 4.

TABLE 4

| UL = | [3 | −1 | 0 | −1 | −1 | 0] | UR = | [0 | 0 | 0 | 0 | 0] |
|---|---|---|---|---|---|---|---|---|---|---|---|---|
| | [−1 | 4 | −1 | 0 | −1 | −1] | | [0 | 0 | 0 | 0 | 0] |
| | [0 | −1 | 3 | 0 | 0 | −1] | | [−1 | 0 | 0 | 0 | 0] |
| | [−1 | 0 | 0 | 2 | −1 | 0] | | [0 | 0 | 0 | 0 | 0] |
| | [−1 | −1 | 0 | −1 | 4 | −1] | | [0 | 0 | 0 | 0 | 0] |
| | [0 | −1 | −1 | 0 | −1 | 5] | | [−1 | 0 | 0 | −1 | 0] |
| LL = | [0 | 0 | −1 | 0 | 0 | −1] | LR = | [4 | −1 | 0 | −1 | 0] |
| | [0 | 0 | 0 | 0 | 0 | 0] | | [−1 | 4 | −1 | −1 | −1] |
| | [0 | 0 | 0 | 0 | 0 | 0] | | [0 | −1 | 2 | 0 | −1] |
| | [0 | 0 | 0 | 0 | 0 | −1] | | [−1 | −1 | 0 | 4 | −1] |
| | [0 | 0 | 0 | 0 | 0 | 0] | | [0 | −1 | −1 | −1 | 3] |

The data for submatrices UL and LR may be placed together (i.e., in local packets) for processing by a set of threads while UR and LL may be placed together (i.e., in global packets) for processing by a set of threads that may or may not be the set of threads processing the local packets. In one embodiment, the storage format for the local and global packets may be the same, but may be interpreted differently by the kernel.

As mentioned earlier, the elements of the matrix are assigned to each of the local and global packets, utilizing an algorithm that increases a contiguousness of the elements being processed by each thread. This may be of particular benefit when a sparse matrix is involved, where such sparse matrix has a relatively small number of nonzero elements.

FIG. 3-G illustrates an example of such element assignment to the local and global threads. In such illustrated example, it is shown how the data format works for packets of 3 threads. In other words, the illustrated three columns of each packet correspond to the three threads of execution. Of course, it should be noted that absolutely any number (e.g. 256, etc.) of threads may be subject to the assignment, as desired.

Also in the present example, there are four packets, two packets (local and global) for each partition. The first local and global packets (e.g. local packet 0 and global packet 0) are used to compute the first 6 elements of the output y-vector (e.g. corresponding to partition A mentioned hereinabove). Similarly, local packet 1 and global packet 1 are used to compute the last 5 elements of the output y-vector (e.g. corresponding to partition B mentioned hereinabove).

Two exemplary algorithms will now be set forth for assigning the matrix elements to the threads that increase a contiguousness of the elements being processed by each thread and which balance the workload across threads. In one embodiment, rows of the submatrices may be assigned to the threads according to a packing heuristic. Such packing heuristic may pack the rows such that the maximum amount of work assigned to any thread in the packet is minimized. In the present embodiment, the heuristic may assign the next row of the matrix to the thread with the least assigned work.

In another embodiment, a heuristic may be used which is particularly suited to a parallel processing architecture. Such heuristic may serve to sort the rows by a number of nonzero entries (NNZ) (e.g. in decreasing order), and then place the rows into threads in a "zig-zag" fashion. For instance, rows [0, 1, 2, 3, 4, 5] of submatrix UL have [4, 5, 3, 3, 5, 4] nonzero entries, respectively. Sorting the rows by the NNZ yields [1, 4, 0, 5, 2, 3]. The aforementioned zig-zag placement places [1, 3] into thread 0, [4, 2] into thread 1, and [0, 5] into thread 2. Since such heuristic can be efficiently implemented on a parallel processing architecture such as a graphics processor, both the construction and multiplication operations may be offloaded thereto.

It should be noted that the row and column indices of the local packets refer to the local row and column order. For example, row 8 of the original matrix corresponds to local row 2 in the second packet (since the second packet begins at row 6). However, in the global packets, the row indices are local, while the column indices are global. This may be necessary because the column index refers to the vector x in global memory. Note that it may often be possible to represent indices in the local packet with fewer bits than required for indices in the total matrix, thus reducing the amount of memory and the amount of memory bandwidth needed to store and process the matrix in this representation.

When operating on the local packet, the kernel fetches x-values from the shared memory using the local column index, and stores y-values into shared memory using the local row index. Further, when operating on the global packet, the kernel fetches x-values from global memory using the global column index, and stores y-values into the shared memory using the local row index.

Exemplary pseudo-code for the first two blocks is shown in Tables 5 and 6, respectively.

TABLE 5

```
Block 0:
    load x[0...5] into shared memory -> x_s[0...5]
    set y_s[0...5] = 0 in shared memory
    thread_id = threadIdx.x
    n = 0;
    while this thread has local work to do:
        row = local_row_packet[n, thread_id]
        col = local_column_packet[n, thread_id] //local column index
        data = local_data_packet[n, thread_id]
        y_s[row] += data*x_s[col]
    _syncthreads( ) ;
    n = 0
    while this thread has global work to do:
        row = global_row_packet[n, thread_id]
        col = global_column_packet[n, thread_id] //global column index
        data = global_data_packet[n, thread_id]
        y_s[row] += data*x [col]
    _syncthreads( );
    store y_s[0 . . . 5] into global memory -> y[0...5]
```

TABLE 6

```
Block 1:
    load x[6...10] into shared memory -> x_s[0...4]
    set y_s[0...4] = 0 in shared memory
    thread_id = threadIdx.x
    n = 0;
    while this thread has local work to do:
        row = local_row_packet[n,thread_id]
        col = local_column_packet[n, thread_id] //local column index
        data = local_data_packet[n, thread_id]
        y_s[row] += data*x_s[col]
    _syncthreads( );
    n = 0
    while this thread has global work to do:
        row = global_row_packet[n, thread_id]
        col = global_column_packet[n, thread_id] //global column index
        data = global_data_packet[n, thread_id]
        y_s[row] += data*x[col]
    _syncthreads( );
    store y_s[0 . . . 4] into global memory -> y[6...10]
```

In various embodiments, the foregoing techniques may be applied in the context of multiplying a sparse matrix and a dense vector. Such multiplication may be used in a variety of applications including, but not limited to iterative solvers for linear systems such as a conjugate gradient, Jacobi relaxation, multigrid methods, etc. Further, eigenvalue problems can be solved with power iteration, Arnoldi iteration, Lanczos iteration, etc. Other applications may include computationally similar procedures, such as the Bellman-Ford shortest path algorithm, which do not perform matrix multiplication as such but which exhibit the same data access patterns as matrix multiplication. Of course, such applications should be not be construed as limiting in any manner whatsoever as any matrix processing is contemplated.

Figure 4:
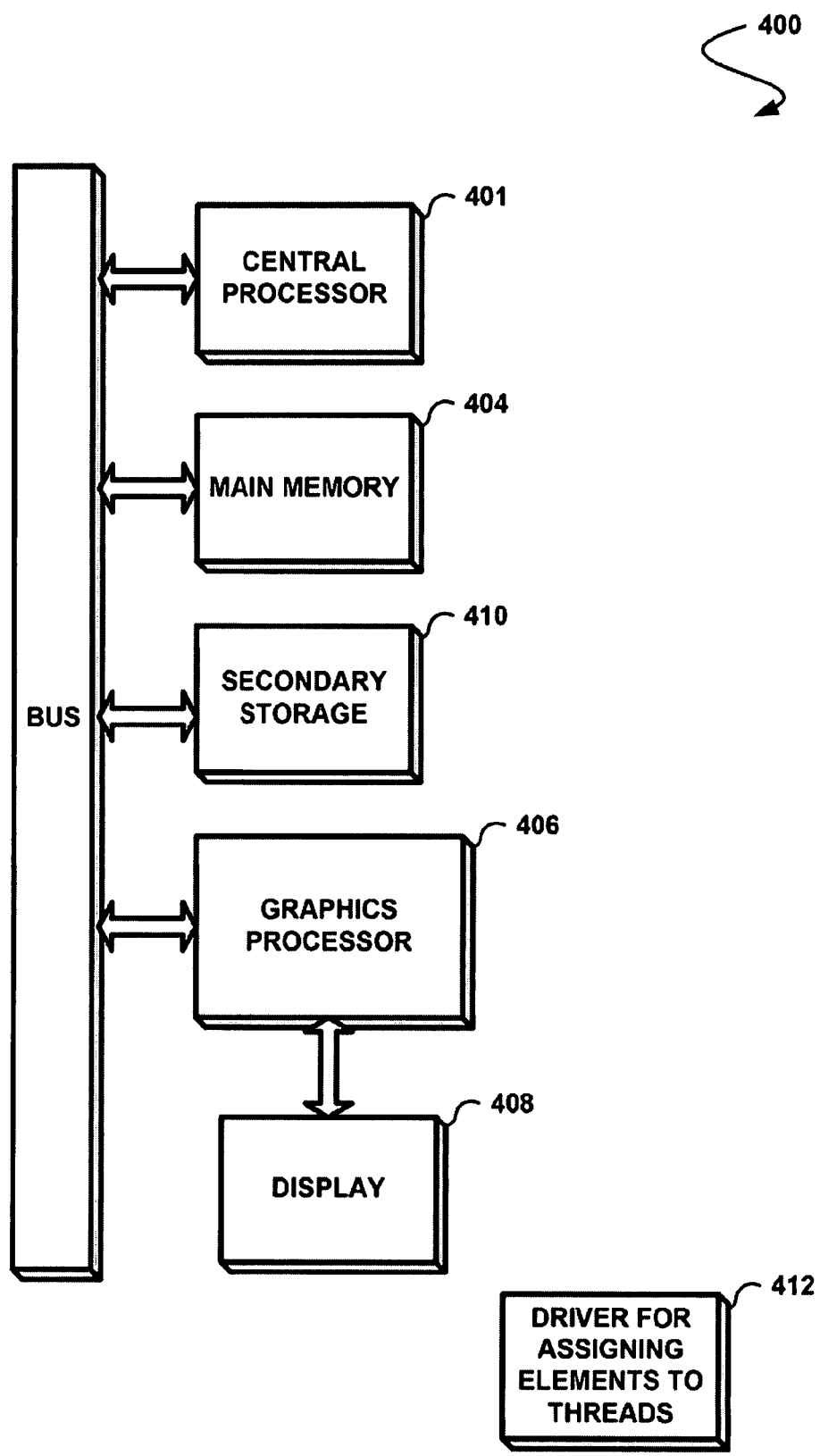
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter. Further, the matrix element assignment functionality of the various previous figures may, in one possible embodiment, be implemented in any of the foregoing integrated circuits, under the control of a driver 412.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a first matrix of elements to be processed by a parallel processing architecture including a plurality of processors each capable of processing a plurality of threads, wherein the first matrix encodes a connectivity of mesh vertices;
   partitioning the first matrix into a first partition and a second partition, such that the first partition contains a first group of the elements corresponding to a first group of the mesh vertices, and the second partition contains a second group of the elements corresponding to a second group of the mesh vertices;
   reordering the first matrix to generate a second matrix having the same elements as the first matrix for localizing subsequent memory accesses, wherein at least one element of the first group of elements of the first partition and at least one element of the second group of elements of the second partition are each moved to new positions within the second matrix;
   defining a first portion of the second matrix as an area within at least one of the first partition of the first matrix and the second partition of the first matrix;
   defining a second portion of the second matrix as an area outside of both the first partition of the first matrix and the second partition of the first matrix;
   processing, by a first set of the plurality of threads, the first portion of the second matrix utilizing a first memory; and
   processing, by a second set of the plurality of threads, the second portion of the second matrix utilizing a second memory.

2. The method of claim 1, wherein the processing includes a multiplication of the second matrix and a vector.

3. The method of claim 1, wherein the elements of the second matrix are assigned to each of the threads independent of an order of a row and a column of the second matrix.

4. The method of claim 1, wherein the second memory is separate from the first memory.

5. The method of claim 4, wherein the reordering increases a number of the elements in the first portion of the second matrix that is subject to the processing utilizing the first memory.

6. The method of claim 4, wherein the first memory includes shared memory and the second memory includes global memory.

7. The method of claim 4, wherein the elements of the first portion of the second matrix are processed utilizing a first packet.

8. The method of claim 7, wherein the elements of the second portion of the second matrix are processed utilizing a second packet.

9. The method of claim 1, wherein the reordering is performed by a central processing unit.

10. The method of claim 1, wherein the parallel processing architecture includes a single instruction multiple data architecture.

11. The method of claim 1, wherein the parallel processing architecture includes a graphics processor.

12. The method of claim 1, wherein the parallel processing architecture includes a processor with one or more vector processing elements.

13. The method of claim 1, wherein the partitioning of the first matrix into the first partition containing the first group of the elements corresponding to the first group of the mesh vertices, and the second partition containing the second group of the elements corresponding to the second group of the mesh vertices, includes:
    identifying an edge cut associated with a smallest number of cut edges between aggregates of the mesh vertices for splitting the mesh vertices into the first group of the mesh vertices and the second group of the mesh vertices; and
    splitting the mesh vertices into the first group of the mesh vertices and the second group of the mesh vertices along the edge cut associated with the smallest number of cut edges between aggregates of the mesh vertices.

14. The method of claim 1, wherein the reordering of the first matrix to generate the second matrix includes moving all rows and columns of the elements of the first partition corresponding to the first group of mesh vertices to precede all rows and columns of the elements of the second partition corresponding to the second group of mesh vertices.

15. The method of claim 1, wherein the processing of the first portion of the second matrix utilizing the first memory includes collecting together data for the first partition and data for the second partition in a local packet for processing by the first set of the plurality of threads.

16. A computer program product embodied on a non-transitory computer readable medium, comprising:
    computer code for receiving a first matrix of elements to be processed by a parallel processing architecture including a plurality of processors each capable of processing a plurality of threads, wherein the first matrix encodes a connectivity of mesh vertices;
    computer code for partitioning the first matrix into a first partition and a second partition, such that the first partition contains a first group of the elements corresponding to a first group of the mesh vertices, and the second partition contains a second group of the elements corresponding to a second group of the mesh vertices;
    computer code for reordering the first matrix to generate a second matrix having the same elements as the first matrix for localizing subsequent memory accesses, wherein at least one element of the first group of elements of the first partition and at least one element of the second group of elements of the second partition are each moved to new positions within the second matrix;
    computer code for defining a first portion of the second matrix as an area within at least one of the first partition of the first matrix and the second partition of the first matrix;
    computer code for defining a second portion of the second matrix as an area outside of both the first partition of the first matrix and the second partition of the first matrix;
    computer code for processing, by a first set of the plurality of threads, the first portion of the second matrix utilizing a first memory; and
    computer code for processing, by a second set of the plurality of threads, the second portion of the second matrix utilizing a second memory.

17. The computer program product of claim 16, wherein the computer code is embodied in a library.

18. An apparatus, comprising:
a parallel processing architecture, including a plurality of processors each capable of processing a plurality of threads, for:
receiving a first matrix of elements to be processed by the parallel processing architecture including the plurality of processors, wherein the first matrix encodes a connectivity of mesh vertices;
partitioning the first matrix into a first partition and a second partition, such that the first partition contains a first group of the elements corresponding to a first group of the mesh vertices, and the second partition contains a second group of the elements corresponding to a second group of the mesh vertices;
reordering the first matrix to generate a second matrix having the same elements as the first matrix for localizing subsequent memory accesses, wherein at least one element of the first group of elements of the first partition and at least one element of the second group of elements of the second partition are each moved to new positions within the second matrix;
defining a first portion of the second matrix as an area within at least one of the first partition of the first matrix and the second partition of the first matrix;
defining a second portion of the second matrix as an area outside of both the first partition of the first matrix and the second partition of the first matrix;
processing, by a first set of the of threads, the first portion of the second matrix utilizing a first memory; and
processing, by a second set of the plurality of threads, the second portion of the second matrix utilizing a second memory.

19. The apparatus of claim 18, wherein the parallel processing architecture includes at least one of a graphics processor and a cell processor.

20. The apparatus of claim 18, wherein the plurality of processors remain in communication with memory and a display via a bus.

21. The apparatus of claim 18, wherein a driver is capable of providing general computational capabilities utilizing the parallel processing architecture.

* * * * *